United States Patent Office 2,697,124
Patented Dec. 14, 1954

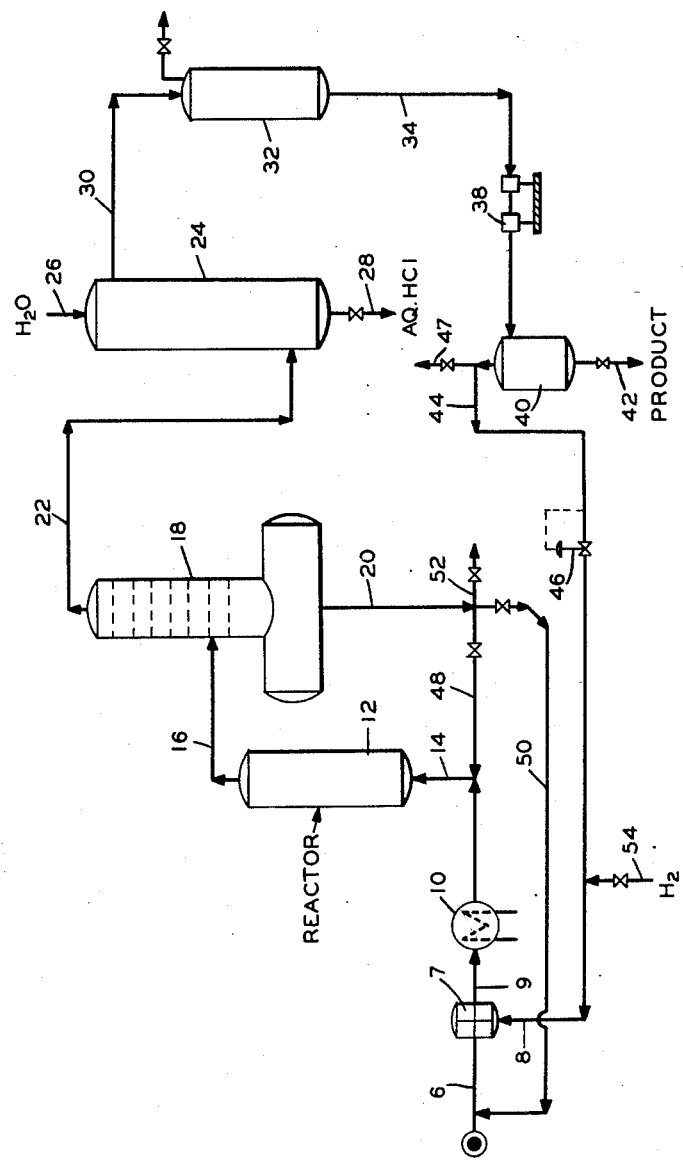

2,697,124

DEHALOGENATION OF FLUOROHALOCARBONS

Russell M. Mantell, Orange, N. J., assignor to The M. W. Kellogg Company, Jersey City, N. J., a corporation of Delaware Application February 25, 1952, Serial No. 273,301

11 Claims. (Cl. 260—653)

The present invention relates to a novel method of selectively dehalogenating a fluorohalocarbon, and more particularly pertains to an improved catalytic method for selectively dechlorinating a fluorochlorocarbon.

It is an object of this invention to provide a novel method for the selective dehalogenation of fluorohalocarbons.

Another object of the present invention is to provide a catalytic method for the selective dehalogenation of fluorohalocarbons.

Still another object of this invention is to provide an improved catalytic method for selectively dechlorinating a fluorochlorocarbon.

Other objects and advantages of this invention will become apparent as the description proceeds.

In accordance with the present invention a fluorohalocarbon is selectively dehalogenated by the method which comprises contacting the halogen compound with a metal not higher than magnesium in the electromotive series and/or a compound thereof, in the presence of hydrogen.

It was quite unexpectedly observed that the selective dehalogenation of a fluorohalocarbon by means of a metal not higher than magnesium in the electromotive series and/or a compound thereof in the presence of hydrogen and/or a material which is capable of furnishing hydrogen for exchange with released halogen will result in a dehalogenated product which contains substantially all of the fluorine. Such an occurrence is contrary to expected performance, because the selective dehalogenation reaction is effected under conditions which are conducive to non-selective removal of halogen. Further, the catalytic agent performs the selective dehalogenation reaction without significant hindrance from the available hydrogen or hydrogen-supplying material.

The function of hydrogen in the present invention is not completely understood. One possible explanation is that the dehalogenating agent is first converted to a halide as a result of dehalogenating and then the halide is converted by the hydrogen to a suitable catalytic form. Another explanation is that the dehalogenating agent serves as a contact catalyst, in that, hydrogen is sorbed on the surface of the catalyst and reacts directly with halogen which is removed from the organic halogen compound. From laboratory observations, both theories find some support, because apparently both reducible and non-reducible metal salts serve as dehalogenating catalysts. However, it should be understood that I do not intend to be bound by any theories, but that they are offered as possible explanations of the reaction mechanisms.

The process of this invention is applicable generally for the selective removal of one or more halogen atoms other than fluorine from fluorohalocarbons. The removed halogen can be any one or more of the different halogens, such as chlorine, bromine and/or iodine. The presence of hydrogen or a material which is capable of furnishing hydrogen under reaction conditions does not have a significant effect upon the selective dehalogenation reaction, which is effected by the catalytic agent. A particularly effective application involves the selective dechlorination of a fluorochlorocarbon by the removal of a single atom of chlorine from each of adjacent carbon atoms.

The material to be selectively dechlorinated is a fluorohalocarbon which contains at least one atom of halogen other than fluorine. The organic reactant includes a variety of classes of compounds, e. g., fluorochlorocarbons, fluorobromocarbons, fluoroiodocarbons, etc.; or it can be a fluorohalocarbon in which two or more different atoms of halogen are present in addition to fluorine. The removal of halogen results in the formation of an unsaturated product, notwithstanding the presence of hydrogen under reaction conditions, and the unsaturated product has retained substantially all of the fluorine originally present in the reactant. The features of producing an unsaturated dehalogenated product and of furnishing a means whereby at least one atom of halogen other than fluorine is removed from a fluorohalocarbon represent an unusual process. Specific examples of compounds which can be selectively dehalogenated are sym.-dichlorodifluoroethane, 1,2-dichloro-1,1,3,3,3-pentafluoropropane; 1,2 - dichlorotetrafluoroethane; 1,2-difluorotetrachloroethane; 1,2-dichlorodifluoroethylene; 1,1,2-trichloro-2,3,3,3-tetrafluoropropane; 3-chloro-2-bromooctafluoro-2-propane; cyclic 1,2 - dichlorohexafluorobutane; 1,4 - dibromo-octafluorobutene; etc.

The catalytic agent of this invention is a metal which is not higher than magnesium in the electromotive series or a compound thereof. The metal may be derived from groups I, II, III, IV, V, VI, VII, and VIII of the periodic table, and is one which is capable of exerting catalytic action under dehalogenation conditions and maintain catalytic activity for reasonably long periods of operation. Metals of this type are, for example, magnesium, aluminum, zinc, iron, cadmium, cobalt, nickel, copper, silver, platinum, chromium, gold, palladium, iridium, rhodium, ruthenium, etc. The catalytic agent can also be used as an inorganic or organic metal compound. In such a state, the metal compound should be capable of conversion to a halide and/or be capable of undergoing decomposition to a form which is catalytically active under reaction conditions. Hence, it should be understood for the purposes of this specification and the appended claims that the metal compound to be used as "catalyst" may be inert as such, but that under reaction conditions it acquires a catalytically active form. The metal compound includes a large variety of classes of compounds, such as for example, the halides (fluorides, chlorides, bromides and iodides), nitrates, nitrites, oxides, carbonates, oxyhalides, formates, acetates, oxalates, hydrides, nitrides, hydroxides, bicarbonates, sulfates, etc. The metal compound can be a reducible or non-reducible catalytic material.

Specific examples of metal compounds which can be used alone or in mixture of two or more thereof are copper acetate, copper formate, ferrous acetate, ferrous oxalate, ferric oxalate, nickelous acetate, nickelous formate, tetramminepalladium chloride, palladium hydride, copper hydride, copper nitride, iron nitride, cobalt chloride, cobalt bromide, cobalt carbonate, cobaltous nitrate, cuprous chloride, cupric nitrate, iridium chloride, ferrous chloride, ferric nitrate, ferric sulfate, nickel bromide, nickel chloride, nickel cyanide, nickel nitrate, nickel sulfate, platinous chloride, platinum sulfate, silver nitrate, silver sulfate, etc.

The catalytic agent may comprise a single salt, compound or metal or a mixture of two or more thereof. In some instances, it is desirable to disperse or distribute the catalytic agent on a carrier material which is inert or active as a dehalogenating agent. Carrier materials useful for this purpose include, for example, fuller's earth, silica, bauxite, kieselguhr, pumice, magnesia, alumina, "Superfiltrol," bentonite clay, etc. When using the carrier material, it comprises about 0.1 to 10 times, preferably about 0.4 to 9 times the weight of the principal catalytic component or components.

The catalytic agent may not require any elaborate preparation prior to use in the reaction zone. In some cases, it may be desirable to charge the material to the reaction zone for treatment under reaction conditions for the purpose of activation or conversion of the material to an active form. It is also intended to subject the catalytic agent to a preliminary treatment whereby it is contacted with a hydrogen-containing gas or a suitable reducing agent prior to use under reaction conditions. In some instances, the catalytic agent may be charged directly to the reaction zone without any activation treatment, because it will be available in an active form. When the catalyst material is available in the form of a compound, it is preferred to subject same to a preliminary treatment in order to convert the material to a higher active state prior to use in the reaction. The preliminary treatment involves subjecting the catalyst to a reducing agent or a hydrogen-containing gas, e. g., hydrogen, at a temperature of 100° to 800° C., and for a period of about 0.5 to 10 hours.

The reducing agent which is present during the dehalogenation reaction includes hydrogen or any material which is capable of furnishing hydrogen under reaction conditions. The hydrogen-supplying material appears to undergo an exchange with the liberated or released halogen by furnishing at least one atom of hydrogen for reaction with the removed halogen to form hydrogen halide and/or then reacting with one or more of the unsaturated bonds in the reducing material to form a halide. When using hydrogen as the reducing agent, hydrogen halide is the only by-product formed. Thus the use of either hydrogen or any other reducing agent will depend upon the type of by-products sought. Therefore, the reducing agent can be (1) hydrogen in the form of a pure gas; and/or (2) a hydrogen-containing gas; and/or (3) a compound which liberates or releases hydrogen under reaction conditions, viz., a hydrogen-supplying material.

For the purposes of this invention, it is necessary to conduct the selective dehalogenation reaction in the presence of hydrogen. As previously indicated, this hydrogen can be supplied as such or in the form of a material which will liberate or release same under reaction conditions. Hence, any reference to the "presence of hydrogen" under reaction conditions or in the reaction is meant to include, for the purpose of this invention, charging any type of reducing agent to the reaction zone for this purpose.

The hydrogen-supplying material which can serve as reducing agent is selected from a variety of classes of compounds including paraffinic hydrocarbons; olefinic hydrocarbons; the halides of hydrocarbons containing hydrogen which can be liberated or released under reaction conditions; aromatic compounds, e. g., benzene and its homologues, naphthalene and its homologues, etc.; cycloaliphatic compounds; hydrogenated products of benzene, naphthalene, anthracene, etc.; camphane and its homologues; polybenzene compounds; etc. Specific examples of compounds are methane, ethane, propane, butane, pentane, ethylene, propylene, hexylene, ethylmonochloride, cyclopentane, cyclohexane, decahydronaphthalene, tetrahydronaphthalene, benzene, toluene, xylene, ethyl benzene, trimethylbenzene, cymen, propylbenzene, etc.

The concentration of hydrogen in the dehalogenation reaction should be controlled to avoid hydrogenation of product materials. The presence of large excesses of hydrogen and/or the use of high reaction pressures tend to favor hydrogenation reactions, and therefore, should be avoided when it is desired to produce an unsaturated dehalogenated product. On the other hand, exceptionally low amounts of hydrogen may possibly cause at least part of the catalyst to be converted to an inactive form, and thus be rendered ineffective until additional hydrogen is present to convert the catalyst to the active form. Hence, it can be be seen that for optimum performance the amount of hydrogen present under reaction conditions should be sufficient to prevent an appreciable amount of the catalyst to be converted to an inactive form and to effect little or no hydrogenation of the product materials. Hence, the amount of hydrogen which is present in the reaction can vary from a large excess to a small amount relative to the organic feed, with varying degrees of effectiveness.

The amount of reducing agent employed for the purposes of this invention will be measured as the quantity charged to the reaction zone, because it is inconvenient, as a practical matter, to measure the hydrogen concentration in the reaction zone. Generally, the reducing agent is used in the amount of about 0.1 to about 15 mols per mol of organic reactant. In the case of hydrogen as the reducing agent, it is preferred to use about 0.1 to 5 mols of same per mol of organic reactant, although more usually about 0.1 to about 0.5 mol of hydrogen per mol of organic reactant is used. With respect to the hydrogen-supplying material, it is preferred to use about 0.1 to about 10 mols per mol of organic reactant. It should be understood, however, that amounts of reducing agent outside the ranges specified above can be used with less satisfactory results.

In practicing this invention, the catalytic agent is present in the reaction zone as a solid material and the organic reactant along with the reducing agent are contacted therewith for the desired result. The physical form of the catalyst will depend on such factors as availability of the particular physical type of catalyst and the intimacy of contact which is sought among the reactants and the catalyst. Generally, the catalyst can be used as a lump, pelleted, granular or finely divided material, which ever form is suitable and available for the reaction. The most efficient contact between the catlyst and reactants is obtained with a finely divided catalyst, i. e., a catalyst having a particle size in the order of about 5 to 250 microns or more usually about 10 to 100 microns. Such a catalyst can be fluidized by the passage of gases or vapors therethrough at a superficial linear velocity in the order of about 0.1 to 50 feet per second, or more usually, about 0.1 to 6 feet per second to produce a lean or dense bed of catalyst. A fluidized solid material resembles a liquid with respect to fluistatic pressure, flow characteristics, etc., hence, it furnishes a means of intimately contacting finely divided solid particles and gaseous materials. The passage of the organic reactant, i. e., the fluorohalocarbon in contact with the catalyst is controlled to effect a residence or contact time of about 0.1 to about 50 seconds, preferably about 1 to about 10 seconds. These residence times can be used for any type of system contemplated, i. e., fluid or non-fluid bed in a fixed or moving bed system and for any physical form of catalyst. With respect to the organic feed or reactant, the amount of catalyst employed can be conveniently expressed as about .01 to about 0.5 mol of feed per minute per pound of catalytic material.

The reaction temperature generally used for this invention is about 100° to about 800° C., preferably about 200° to about 600° C. Temperatures above 600° C. are usually less desirable, because undesirable side reactions such as degradation, dehydrogenation, etc., occur in increasing amounts. The reaction can be conducted conveniently at atmospheric pressure, although sub-atmospheric or super-atmospheric pressure can also be used. In practice, the pressure of reaction can be maintained in the range of about 0.1 to 15 atmospheres. Higher pressures can be used with less satisfactory results, because at such pressures there is an increased tendency for hydrogenation to occur.

At the temperatures and pressures specified above, the reaction may exist in the vapor or liquid phase depending on the type of organic reactant being dehalogenated. For relatively low molecular weight compounds, the system can be operated very satisfactorily in the vapor phase; whereas in the case of higher molecular weight compounds a liquid phase system is suitable. It should be borne in mind that the selection of a reaction temperature should be made with a view of avoiding thermal decomposition of the organic reactant or product. In some cases, it is found that the catalytic agent will become coated with a carbonaceous material after the process has been in operation for a period of time. This is indicative of thermal decomposition of the processing materials. It is contemplated subjecting the catalyst to a regeneration treatment with an oxygen-containing gas, e. g., air or oxygen, at a temperature of about 600° to about 1250° F., using about 5 to 25 pounds of air, or an equivalent amount of oxygen-containing gas on an available oxygen basis, per pound of carbonaceous material. The regeneration treatment may be effected by passing the catalyst from the reaction zone to a separate regeneration zone or the reaction phase may be discontinued by stopping the flow of reactant materials to the reactor, and then passing the desired regeneration gas into the reactor with or without first purging the reactor by means of an inert gas, such as for example, steam, nitrogen, carbon dioxide, etc., prior to the regeneration treatment.

After the reactant materials have undergone processing in accordance with the present invention, the reaction product undergoes treatment for separation of the desired dehalogenated material. In the case of using hydrogen as the reducing agent, it is found that a substantial part or all of the removed halogen appears in the product as halogen halide. The hydrogen halide can be readily removed from the reaction product by absorption, fractionation, etc. Generally, the hydrogen halide can be removed by a liquid solvent, such as for example, water, monohydric aliphatic alcohols, dihydric aliphatic alcohols, ethers, dioxanes, primary amines, secondary amines, alkanol amines, etc.; or solid absorptive materials such as calcium oxide, calcium hydroxide, soda-lime, etc. The removal of hydrogen halide from the reaction product leaves essentially the desired dehalogenated product, unreacted hydrogen, unreacted fluorohalocarbon and by-product materials. The unreacted fluorohalocarbon can be removed by suitable means, e. g., distillation, either before or after the removal of the hydrogen halide from the reaction product. Ordinarily, it is preferred to remove the unreacted fluorohalocarbon prior to the removal of hydrogen halide, because lower heat requirements are required for product recovery. In this invention the unreacted fluorohalocarbon may be discarded or removed from the system or it can be recycled to the reactor with or without suitable pre-heat.

The removal of hydrogen halide and unreacted fluorohalocarbon from the product stream is followed by first a drying operation and then by a separating step in which hydrogen is removed from the product stream. Conveniently, the hydrogen can be recovered by condensing the higher boiling components in the product stream to the liquid state, or the product stream can be compressed to a higher pressure level to effect the same purpose. In either method, it is preferred to initially remove any water which may be present as a result of using water to absorb the hydrogen halide, or otherwise. Drying can be accomplished by passing the product stream over a suitable drying agent, such as for example, silica gel, bauxite, etc. After liquefying the dehalogenated materials and other relatively high boiling point materials, the recovered hydrogen can be recycled to the reactor with or without pre-heat. Any hydrogen which is consumed in the reaction can be replenished by adding to the recycled hydrogen stream, the hydrogen-supplying material or hydrogen gas. It should be understood that recycling of the unreacted fluorohalocarbon and hydrogen is not essential to the present invention, however, it is the preferred method of operation.

In the case of employing a hydrogen-supplying material as the reducing agent, the task of recovering the desired dehalogenated product is more involved than the procedure described above. In such a situation, there may be present in the reaction product, hydrogen halide as well as halogenated derivatives of the hydrogen-supplying material. Depending on the relative boiling points among the halogenated derivatives of the hydrogen-supplying material, the dehalogenated product and the unreacted materials, the sequence of steps for separation of the desired product will vary considerably. In a situation involving a high boiling point organic reactant and a low boiling point reducing agent, it may be desirable to first remove hydrogen halide by the method indicated above, followed by a removal of unreacted reducing agent alone or in admixture with the halogenated derivative thereof. This step may be preceded by a drying operation, or the drying operation may be conducted after the removal of the reacted and/or unreacted reducing agent is effected. Thereafter, the dehalogenated product and unreacted organic reactant are separated from each other by suitable means e. g., fractionation. Another situation involves a high boiling reducing agent and a low boiling organic reactant. In such an event, the order of separation as given above is reversed in order to first separate dehalogenated product and/or unreacted organic reactant as a total stream, after the removal of hydrogen halide. After drying the materials, either before or after the last-named separation step, the halogenated derivatives of the reducing agent and the unreacted reducing agent are separated from each other by suitable means, e. g., fractionation.

This process offers a means of producing halogenated derivatives of reducing agents as by-products to a selective dehalogenation reaction. This combination is unusual, and can serve the two-fold purpose of obtaining a particular dehalogenated material as well as a desired halogenated product by utilizing part of the halogen which is removed in the dehalogenation reaction. When the use of a hydrogen-supplying material as reducing agent creates a disposal problem with respect to the halogenated derivative thereof, then hydrogen should be used as the reducing agent. In any event, it is to be noted that my process also offers a method of producing substantial quantities of hydrogen halide.

In order to more fully understand the present invention, reference will be had to Figure 1 of the drawings which form a part of this specification and illustrates schematically a specific example of my process.

In the drawing, an organic feed, such as for example, trichlorotrifluoroethane is fed from the supply source through a line 6 at the rate of about 15 mols per minute to a mixing chamber 7. The trichlorotrifluoroethane is combined with a hydrogen-containing gas stream by means of a line 8. The hydrogen rate is in the order of about 3 mols per minute and on a relative basis with the organic feed, the mol ratio of organic feed to hydrogen is 5:1. As a combined stream, the organic feed and hydrogen is passed to a suitable heater 10 wherein the temperature of the reactant materials is raised to about 300° C. The heated reactant materials enter the bottom of reaction vessel 12 through a line 14. The reaction vessel is essentially a vertical, cylindrical vessel of 50 liter capacity which contains about 18.5 kilograms of copper gauze which serve as a catalyst. The pressure in the reaction zone is maintained at essentially 15 p. s. i. absolute, and the temperature is maintained at 490–550° C. Under these conditions, the reactant materials which are in contact with the copper are converted to chlorotrifluoroethylene, trifluoroethylene, vinylidene fluoride and hydrogen chloride. Chlorine is removed from the organic starting material, viz., trifluorotrichloroethane, and combines with the hydrogen which is present in the reactor to form hydrogen chloride. In the product stream there remains some unreacted trifluorotrichloroethane and hydrogen. In this example, the reactant materials are in contact with the copper catalyst for about 1.8 seconds. After approximately 3 hours of operation, the trifluorotrichloroethane is converted to about 40 kilograms of chlorotrifluoroethylene, 5.6 kilograms of trifluoroethylene and 1 kilogram of vinylidene fluoride. The reaction product leaves the reactor through an overhead line 16. The vaporous product is fed into the lower part of a fractionating column 18, wherein the unreacted trifluorotrichloroethane is separated as a bottom product and withdrawn from the fractionating column through a bottom line 20. The temperature in the bottom of the tower is maintained at about 0° C. The overhead temperature in the fractionating tower is maintained at $-20°$ C., in order that hydrogen, hydrogen chloride and the desired product and by-products are yielded as an overhead stream. The overhead product from the fractionating tower 18 is in a vapor condition which flows through an overhead line 22 and then passes to the bottom part of an absorption tower 24, which is loosely packed with ceramic Berl saddles. In the absorption tower, hydrogen chloride is removed by absorption with water which is fed into the top of the tower through an overhead line 26. The aqueous solution of hydrogen chloride is withdrawn from the absorption tower through a bottom line 28. The water and the product stream flow countercurrently with each other, and the product stream, substantially denuded of hydrogen chloride, is discharged from the absorption zone through an overhead line 30 at the top part of the tower.

As a result of removing hydrogen chloride in the product stream through absorption with water, moisture or entrained water is contained in the vapor product leaving the absorption zone. The moisture-laden product stream which leaves the absorption zone through line 30 is fed into a dryer 32, wherein is contained granular silica gel for adsorbing water. The product stream leaves the dryer in a substantially dried condition through a bottom line 34. The stream passes to a compressor 38 wherein the pressure of the stream is raised to about 2000 p. s. i. g. As a result, the chlorotrifluoroethylene, trifluoroethylene and vinylidene fluoride are condensed to a liquid state. The compressed fluids leave the compressor and are thereafter passed to a separator 40. In the separator the liquid product is discharged from a bottom line 42 and is thereafter passed to a fractionating system (not shown), wherein the chlorotrifluoroethylene is separated as a substantially pure product of about 99.7% purity. The hydrogen gas passes through an overhead line 44 of the separator in which is located a control valve 46, whereby the flow of hydrogen is regulated. Alternatively, the hydrogen-containing gas may be vented from vessel 40 through a valved line 47. Make-up hydrogen is introduced into the system through a valved line 54 in an amount sufficient to maintain the 5:1 ratio of organic halide to hydrogen. The hydrogen in line 44 is then passed to line 8 from which it flows for admixture with the incoming organic feed in line 6.

The unreacted trifluorotrichloroethane, which is separated in fractionating tower 18 and discharged through the bottom line 20 thereof, can be recycled directly to the bottom of the reactor 12 through a valved line 48. Alternatively, the unreacted organic feed can be recycled through a valved line 50 which is joined with line 6. In this manner, the unreacted feed is preheated along with the fresh feed materials prior to being recycled to the reaction zone. Still another alternative is to discharge any unreacted feed material from the system through a valved line 52.

Various other types of catalyst and different feed materials were dehalogenated in accordance with the process of the present invention. These tests were conducted on a laboratory scale in an apparatus essentially similar to that shown in Figure 1 of the drawings, but of smaller size. Also the hydrogen was removed and the condensable products collected by cooling the dried reactant gases instead of by compression as shown for the large scale operation.

The laboratory apparatus comprised a 30 inch long Pyrex tube, 1⅜ inch internal diameter, as the reactor. This reactor was surrounded by an electric furnace 26 inches in length to maintain the desired temperature within the reaction zone. A Pyrex flask of 250 ml. capacity, containing inlet tubes for the introduction of hydrogen and fresh or recycle feed, was fitted to the lower end of the reactor tube. The Pyrex flask was heated with an electric heating mantle. The reaction products passed from the upper end of the reactor tube to a condenser, where unreacted feed was removed and returned for recycle. The products were then passed through a tower for a water wash, a drying tower, and cold traps of (a) Dry Ice and (b) liquid nitrogen. Unused hydrogen was vented from the system, and the remaining liquid product was distilled in a fractionating column.

For each test, the reactor tube was packed with catalyst so as to occupy about 22 inches of reactor length. In starting up, hydrogen was passed through the reactor while it was being brought up to a temperature of about 550° C. for the purpose of drying and/or reducing the catalyst material. When this operation was substantially complete, the furnace temperature was adjusted to the desired range and the organic feed and hydrogen rates to the reactor were adjusted to the desired rates. (Vaporization of the liquid organic feed was effected by means of the electric mantle.) Samples of the product gases and the hydrogen halide-rich water from the absorption tower were withdrawn at periodic intervals and analyzed.

Utilizing the laboratory equipment described above, various materials were tested for catalytic properties in the dehalogenation of trifluorotrichloroethane. This particular organic reactant was chosen, because the dehalogenation results would clearly indicate whether halogen other than fluorine can be removed without significantly affecting the fluorine content of the feed. The preservation of the ethylenic linkage, the fluorine content of the dehalogenated product and the catalytic nature of the dehalogenating agent serve to demonstrate the unusual characteristics of this process. Hence, the result of using trifluorotrichloroethane as the reactant would be fairly representative of the selective nature of the catalytic agent for all fluorohalocarbons. The results are shown in Table I below.

*Table I*

| Ex. No. | Catalyst* | Organic Halogen Compound | Organic Feed Rate, mol/min. | $H_2$ mol/min. | Percent $H^2$ consumed | Temp., °C. | Contact Time, sec. | $CF_2=CFCl$ mol percent of product | Comment |
|---|---|---|---|---|---|---|---|---|---|
| 1 | Cu gauze | Trifluorotrichloroethane. | 0.15 | 0.03 | 80–90 | 580 | 1.8 | 78.0 | |
| 2 | Cu on MgO | ----do---- | 0.15 | 0.03 | 65 | 550 | 2.0 | 76.6 | |
| 3 | Co/Cu/MgO | ----do---- | 0.15 | 0.03 | 75 | 480 | 2.0 | 93.2 | |
| 4 | Co/Cu/MgF$_2$*** | ----do---- | 0.15 | 0.03 | 65 | 470 | 2.3 | 96.7 | |
| 5 | Ag gauze | ----do---- | 0.15 | 0.03 | 42 | 560 | 2–3 | 80.1 | |
| 6 | Pt on Alumina | ----do---- | 0.06 | 0.03 | 40 | 540 | | 77.4 | |
| 7 | Co/MgO | ----do---- | 0.15 | 0.03 | 60 | 540 | | 86.4 | |
| 8 | MgF$_2$ | ----do---- | 0.15 | 0.03 | 35 | 550 | 2–3 | 84.5 | |
| 9 | Glass beads | ----do---- | 0.05 | 0.15 | | 540 | 2 | 50 | |
| 10 | ----do---- | ----do---- | 0.05 | 0.15 | | 590–600 | 2 | 40 | Copious liberation of HCl with carbon deposition. |
| 11 | Activated carbon. | ----do---- | 0.09 | 0.09 | | 350–400 | 2 | | Mixture of dehalogenated products. Both fluorine and chlorine removed.** |

*See description of catalysts below.
**This was determined from the analysis of hydrogen halide-rich water from water absorption column.
***No perceptible drop-off in catalytic activity after 20 hours continuous run for this catalyst.

The catalysts employed for the tests reported in Table I are described below.

The copper and silver gauze consisted of ribbons having a width of 0.5 to 0.75 mm.

Cu on MgO was prepared by mixing 60% magnesia with 40% copper powder, parts by weight, and then the mixture was pressed into 3/16 inch pellets.

The Co/Cu/MgO catalyst was prepared by using a mol ratio of 1:30:150 of $CoCl_2 \cdot 6H_2O$, $CuCl_2$ and MgO, respectively. The mixture was first pressed into 3/16 inch pellets and then reduced with hydrogen at a temperature of 500° C. and for a period of 5 hours.

The Co/Cu/MgF$_2$ catalyst was prepared by using a mol ratio of 1:30:150 of $CoCl_2 \cdot 6H_2O$, $CuCl_2$ and $MgF_2$, respectively. The mixture was first pressed into 3/16 inch pellets and then reduced with hydrogen at a temperature of 480° C. and for a period of 5 hours.

The Co/MgO catalyst was prepared by using a mol ratio of 1:30 of $CoCl_2 \cdot 6H_2O$ and MgO, respectively. The mixture was first pressed into 3/16 inch pellets and then reduced with hydrogen at 550° C. and for 5 hours.

The Pt on alumina catalyst was prepared by impregnating 3/16 inch porous alumina pellets with a water solution of $PtCl_4 \cdot 8H_2O$ containing about 2.5 grams of $PtCl_4 \cdot 8H_2O$ per 100 grams of alumina, evaporating to dryness at 100° C. and reducing the impregnated pellets with hydrogen at about 500° C. for about 5 hours.

The results shown in Table I clearly indicate that my process is unusually effective for maintaining the activity of the catalytic material or dehalogenating agent, and produces a substantial yield of desired products. The high yields of chlorotrifluoroethylene are indicative of the wide application of this process for selective dehalogenation of fluorohalocarbons, because the presence of hydrogen does not seem to affect the ethylenic linkage in the molecule and the fluorine content of the feed is substantially retained. Furthermore, the fluorine content of the product is sufficient showing for the application of this process to selective dehalogenation of fluorohalocarbons generally.

Examples 9 and 10 in Table I were performed to determine whether any thermal reaction took place between hydrogen and the organic reactant. At a temperature of about 540° C., it is found that about 7% of the organic feed is dehalogenated and about 50 mol per cent of the product is chlorotrifluoroethylene. However, at a temperature of 590–600° C., there is a noticeable liberation of hydrogen halide and about 20% of the feed reacted with hydrogen. While about 40 mol per cent of the product is chlorotrifluoroethylene, the reaction has taken place to noticeable extent, indicating that the fluorohalocarbon and hydrogen reacted thermally to a significant extent.

Example 11 of Table I involves the dehalogenation of a fluorohalocarbon by contacting same with carbon in the presence of a reducing agent, e. g., hydrogen. The dehalogenation took place without selectivity as to the number or position of the halogen in the feed as is evidenced by the finding of both fluorine and chlorine in the wash water of the absorption tower. Consequently, for this process the deposition of carbon is to be avoided because of its adverse effect on selectivity or product distribution. Accordingly, to avoid the adverse effects of carbon, the catalyst may be regenerated with an oxygen-containing gas when the carbon concentration on catalyst is about 0.1 to 10%, based on the weight of the catalyst.

Additional experiments were conducted in the laboratory equipment described above, utilizing a different kind of feed stock than what was employed in Table I. These results are given in Table II below.

I claim:
1. A process for selectively dehalogenating a fluorohalocarbon which comprises contacting said fluorohalocarbon with a catalyst selected from the group consisting of silver, cobalt on a carrier, a mixture of cobalt and copper on a carrier, platinum on a carrier, and magnesium fluoride, about one pound of said catalyst being present for between about 0.01 and about 0.5 mol of said fluorohalocarbon feed per minute in the presence of between about 0.1 and about 15 mols of hydrogen, and maintaining said fluorohalocarbon and hydrogen in contact with said metal catalyst for a period of time between about 0.1 and about 50 seconds at a temperature between about 200° C. and about 600° C. and a pressure between about 0.1 and about 15 atmospheres.

2. The process of claim 1 wherein the carrier is magnesium oxide.

3. The process of claim 1 wherein the carrier is aluminum oxide.

4. The process of claim 1 wherein the carrier is magnesium fluoride.

Table II

| Ex. No. | Catalyst | Fluorohalocarbon Organic Halogen Compound | Organic Feed, mol/min. | $H_2$ mol/min. | Percent $H_2$ consumed | Temp., °C. | Contact Time, sec. | Period of run, Hrs. | Principal Product (A) | Mol percent (A) of total product |
|---|---|---|---|---|---|---|---|---|---|---|
| 1 | Co/Cu/MgF$_2$* | CF$_2$Cl—CFCl$_2$ | 0.09 | 0.09 | 65 | 470 | 2-3 | 17 | CF$_2$=CFCl | 96.7 |
| 2 | Cu wire** | 1,2-dichlorohexafluorobutane. | 0.5 | 0.005 | 75-80 | 550-70 |  | 8 | chlorotrifluoroethylene | 37.0 |
|  |  |  |  |  |  |  |  |  | hexafluorocyclobutene | 43.0 |
| 3 | Co/Cu/MgF$_2$* | Sym-dichlorotetrafluoroethane. | 0.02 | 0.02 | 95 | 525 |  | 4 | tetrafluoroethylene | 59.4 |
| 4 | Co/Cu/MgF$_2$* | Sym-difluorotetrachloroethane. | 0.075 | 0.015 | 90 | 475 |  | 4 | C$_2$F$_2$Cl$_2$ | 93 |

* Same catalyst as used in Table I.
**Cuprous oxide in the form of rods having 0.04 inch diameter and about 0.25 to 0.5 inch in length were reduced with hydrogen at 500° C. and for 5 hours.

The results shown in Table II demonstrate further the unusual application of this process for the selective dehalogenation of fluorohalocarbons. It is to be noted that in the case of a four carbon atom organic feed, i. e., Example 2 in Table II, the product contains a significant amount of cyclized material.

Other experiments were made in which reducing agents other than hydrogen were employed as the starting material. These results are reported in Table III below.

5. A method of selectively dechlorinating a chlorofluorocarbon which comprises contacting said chlorofluorocarbon with a catalyst selected from the group consisting of silver, cobalt on a carrier, a mixture of cobalt and copper on a carrier, platinum on a carrier, and magnesium fluoride, about one pound of said catalyst being present for between about 0.01 and about 0.5 mol of said chlorofluorocarbon feed per minute, in the presence of between about 0.1 and about 15 mols of hydrogen, and

Table III

| Ex. No. | Catalyst | Organic Feed | Feed Rate mol/min. | Reducing Agent, | Rate of Reducing Agent, mol/min. | Percent of Reducing Agent Consumed | Period of Run, Hrs. | Product yields, Mol Percent (Output Basis) | | | | |
|---|---|---|---|---|---|---|---|---|---|---|---|---|
|  |  |  |  |  |  |  |  | Monohaloderivative of reducing Agent (A) | Yield (A) | Di-halo derivative of reducing Agent (B) | Yield (B) | CF$_2$=CFCl |
| 1 | Co/Cu/MgF$_2$* | Trichlorotrifluoroethane. | 0.1 | Methane. | .02 | 20 | 6 | CH$_3$Cl | 25.8 | CH$_2$Cl$_2$ | 4.2 | 63.4 |
| 2 | Co/Cu/MgF$_2$* | do | .005 | Benzene. | .005 | 40 | 6 | C$_6$H$_5$Cl | 40 | 0 | 0 | 78.0 |

* Same catalyst as used in Table I.

In Table III, it is shown that methane and benzene can be used as reducing agents for the selective dehalogenation of a fluorohalocarbon. In the case of methane, two halogenated derivatives were formed, viz., monochloromethane and dichloromethane. The principal reaction is the formation of the monochlor derivative, and a secondary reaction is the production of the dichloro derivative. This indicates that the monochlor derivative can also serve as a reducing agent, because it apparently liberated or released an atom of hydrogen which combined with removed halogen, and an atom of removed halogen reacted with the monochlor derivative. This serves to illustrate that halogenated derivatives of hydrocarbons can serve as reducing agents as long as they contain hydrogen.

Having thus described my invention by furnishing specific examples thereof, it should be understood that no undue limitations or restrictions are to be imposed by reason thereof, but that the scope of my invention is defined by the appended claims.

maintaining said chlorofluorocarbon and hydrogen in contact with said metal catalyst for a period of time between about 0.1 and about 50 seconds at a temperature between about 200° C. and about 600° C. and a pressure between about 0.1 and about 15 atmospheres.

6. A method of selectively dehalogenating a fluorohalocarbon which comprises passing said fluorohalocarbon and a hydrogen supplying material in a ratio of between about 0.1 to about 10 mols of hydrogen supplying material per mol of said fluorohalocarbon to a reaction zone wherein is present a catalyst selected from the group consisting of silver, cobalt on a carrier, a mixture of cobalt and copper on a carrier, platinum on a carrier and magnesium fluoride, about one pound of said catalyst being present for between about 0.01 and about 0.5 mol of said fluorohalocarbon feed per minute, and maintaining said fluorohalocarbon and hydrogen in contact with said metal catalyst for a period of time between about 0.1 and about 50 seconds at a temperature between about 200° C. and about 600° C. and a pressure between about 0.1 and about 15 atmospheres.

7. A process for selectively dechlorinating trifluorotrichloroethane by the removal of a single atom of chlorine from each of adjacent carbon atoms which comprises contacting said trifluorotrichloroethane with cobalt on magnesium oxide as a catalyst, about one pound of said catalyst being present for between about 0.01 and about 0.5 mol of said trifluorotrichloroethane feed per minute, in the presence of less than equimolar quantities of hydrogen, maintaining said contact for a period of time between about 0.1 and about 50 seconds at a temperature between about 470° C. and about 600° C. and a pressure between about 0.1 and about 15 atmospheres.

8. A process for selectively dechlorinating trifluorotrichloroethane by the removal of a single atom of chlorine from each of adjacent carbon atoms which comprises contacting said trifluorotrichloroethane with cobalt and copper on magnesium fluoride as a catalyst, about one pound of said catalyst being present for between about 0.01 and 0.5 mol of said trifluorotrichloroethane feed per minute, in the presence of less than equimolar quantities of hydrogen, maintaining said contact for a period of time about 0.1 and about 50 seconds at a temperature between about 200° C. and about 600° C. and a pressure between about 0.1 and about 15 atmospheres.

9. A process for selectively dechlorinating trifluorotrichloroethane by the removal of a single atom of chlorine from each of adjacent carbon atoms which comprises contacting said trifluorotrichloroethane with platinum on aluminum oxide as a catalyst, about one pound of said catalyst being present for between about 0.01 and about 0.5 mol of said trifluorotrichloroethane feed per minute, in the presence of less than equimolar quantities of hydrogen, maintaining said contact for a period of time between about 0.1 and about 50 seconds at a temperature between about 200° C. and about 600° C. and a pressure between about 0.1 and about 15 atmospheres.

10. A process for selectively dehalogenating a fluorohalocarbon which comprises contacting said fluorohalocarbon with silver as a catalyst, about one pound of said catalyst being present for between about 0.01 and about 0.5 mol of said fluorohalocarbon feed per minute in the presence of between about 0.1 and about 15 mols of hydrogen, and maintaining said fluorohalocarbon and hydrogen in contact with said metal catalyst for a period of time between about 0.1 and about 50 seconds at a temperature between about 200° C. and about 600° C. and a pressure between about 0.1 and about 15 atmospheres.

11. A process for selectively dehalogenating a fluorohalocarbon which comprises contacting said fluorohalocarbon with magnesium fluoride as a catalyst, about one pound of said catalyst being present for between about 0.1 and about 0.5 mol of said fluorohalocarbon feed per minute in the presence of between about 0.1 and about 15 mols of hydrogen, and maintaining said fluorohalocarbon and hydrogen in contact with said metal catalyst for a period of time between about 0.1 and about 50 seconds at a temperature between about 200° C. and about 600° C. and a pressure between about 0.1 and about 15 atmospheres.

References Cited in the file of this patent

UNITED STATES PATENTS

| Number | Name | Date |
| --- | --- | --- |
| 2,379,697 | Evans et al. | July 3, 1945 |
| 2,389,231 | Blumer | Nov. 20, 1945 |
| 2,504,919 | Bordner | Apr. 18, 1950 |